United States Patent
Takeuchi

(10) Patent No.: US 11,053,366 B2
(45) Date of Patent: Jul. 6, 2021

(54) POLYMERIZABLE COMPOSITION AND COMPOSITE MATERIAL

(71) Applicant: RIMTEC Corporation, Tokyo (JP)

(72) Inventor: Masaki Takeuchi, Tokyo (JP)

(73) Assignee: RIMTEC CORPORATION, Tokyo (JP)

( * ) Notice: Subject to any disclaimer, the term of this patent is extended or adjusted under 35 U.S.C. 154(b) by 278 days.

(21) Appl. No.: 16/069,288

(22) PCT Filed: Jan. 16, 2017

(86) PCT No.: PCT/JP2017/001242
§ 371 (c)(1),
(2) Date: Jul. 11, 2018

(87) PCT Pub. No.: WO2017/138304
PCT Pub. Date: Aug. 17, 2017

(65) Prior Publication Data
US 2019/0031846 A1    Jan. 31, 2019

(30) Foreign Application Priority Data
Feb. 10, 2016 (JP) .............................. JP2016-023426

(51) Int. Cl.
| | |
|---|---|
| *C08J 5/24* | (2006.01) |
| *B29C 70/48* | (2006.01) |
| *C08F 232/08* | (2006.01) |
| *C08J 5/04* | (2006.01) |
| *C08G 61/08* | (2006.01) |
| *C08J 5/08* | (2006.01) |
| *C08K 5/14* | (2006.01) |
| *C08G 18/22* | (2006.01) |
| *C08G 18/62* | (2006.01) |
| *C08G 18/76* | (2006.01) |
| *B29K 33/04* | (2006.01) |
| *B29K 75/00* | (2006.01) |

(52) U.S. Cl.
CPC ............. *C08J 5/24* (2013.01); *B29C 70/48* (2013.01); *C08F 232/08* (2013.01); *C08G 18/222* (2013.01); *C08G 18/6225* (2013.01); *C08G 18/7671* (2013.01); *C08G 61/08* (2013.01); *C08J 5/04* (2013.01); *C08J 5/08* (2013.01); *C08K 5/14* (2013.01); *B29K 2033/04* (2013.01); *B29K 2075/00* (2013.01); *C08J 2375/14* (2013.01)

(58) Field of Classification Search
CPC ......... C08L 65/00; C08K 3/04; C08K 5/0025; C08K 5/14; C08G 2261/3325; C08G 2261/41; C08G 2261/74; C08G 2261/76; C08G 61/08; C08G 18/222; C08G 18/6225; C08G 18/7671; C08F 232/08; C08F 283/14; C08J 2365/00; C08J 5/24; C08J 5/04; C08J 5/08; C08J 2375/14; C08J 5/042; C08J 5/043; B29C 70/48; B29K 2033/04; B29K 2075/00
See application file for complete search history.

(56) References Cited

U.S. PATENT DOCUMENTS

| | | |
|---|---|---|
| 2011/0237718 A1 | 9/2011 | Yoshiwara |
| 2012/0088879 A1 | 4/2012 | Yoshiwara |
| 2017/0037202 A1 | 2/2017 | Takeuchi |
| 2019/0210305 A1 | 7/2019 | Takeuchi |

FOREIGN PATENT DOCUMENTS

| | | |
|---|---|---|
| EP | 3466658 A1 | 4/2019 |
| JP | H11-169826 A | 6/1999 |
| JP | 2010-235699 A | 10/2010 |
| JP | 2012-067401 A | 4/2012 |
| JP | 2014-234410 A | 12/2014 |
| RU | 2544549 C1 | 3/2015 |
| WO | 2010/044461 A1 | 4/2010 |
| WO | 2010/147116 A1 | 12/2010 |
| WO | 2015/098636 A1 | 7/2015 |
| WO | 2015/115936 A1 | 8/2015 |

OTHER PUBLICATIONS

Supplementary European Search Report dated Sep. 10, 2019, issued in counterpart EP Application No. 17750029.5. (6 pages).
Office Action dated Apr. 26, 2020, issued in counterpart CN Application No. 201780009356.3, with English Translation. (17 pages).
Translation of Written Opinion dated Mar. 28, 2017, issued in counterpart application No. PCT/JP2017/001242. (6 pages).
International Search Report dated Mar. 28, 2017, issued in counterpart application No. PCT/JP2017/001242. (2 pages).
Office Action dated Jul. 21, 2020, issued in counterpart EP application No. 17 750 029.5. (3 pages).
Office Action dated Mar. 18, 2021, issued in counterpart EP Application No. 17 750 029.5. (3 pages).

*Primary Examiner* — Leith S Shafi
(74) *Attorney, Agent, or Firm* — Westerman, Hattori, Daniels & Adrian, LLP

(57) ABSTRACT

The present invention relates to polymerizable composition containing a cycloolefin monomer, a metathesis polymerization catalyst, a radical generator, a diisocyanate compound, and a polyfunctional (meth)acrylate compound. The composite material produced by using a polymerizable composition of the present invention has excellent mechanical strength and does not cause odor.

2 Claims, No Drawings

POLYMERIZABLE COMPOSITION AND COMPOSITE MATERIAL

TECHNICAL FIELD

The present invention relates to a polymerizable composition and a composite material in which the polymerizable composition impregnated with a fibrous filler is cured. Further, the present invention relates to a method for producing the composite material.

BACKGROUND ART

So far, crosslinked resin molded articles having excellent mechanical strength using carbon fibers as reinforcing fibers (Patent Publication 1 and Patent Publication 2), and composite molded articles using glass fibers (Patent Publication 3) have been known. However, there were yet some rooms of improvements for molded articles using carbon fibers in mechanical strength, especially flexural strength, and there were some disadvantages that these composite molded articles containing glass fibers generate odor derived from raw material components especially during thermal curing.

PRIOR ART REFERENCES

Patent Publications

Patent Publication 1: JP-A-2010/044461
Patent Publication 2: JP-A-2010/147116
Patent Publication 3: WO 2015/098636

SUMMARY OF THE INVENTION

Problems to be Solved by the Invention

Accordingly, an object of the present invention is to provide a polymerizable composition that does not cause odor after curing and a composite material containing a fibrous filler that has excellent mechanical strength and does not cause odor. Further, an object of the present invention is to provide a method for providing the composite material.

Means to Solve the Problems

Specifically, the gist of the present invention relates to:
[1] a polymerizable composition containing a cycloolefin monomer, a metathesis polymerization catalyst, a radical generator, a diisocyanate compound, and a polyfunctional (meth)acrylate compound;
[2] a composite material wherein a polymerizable composition as defined in the above [1] which is impregnated with a fibrous filler is cured; and
[3] a method for producing a composite material as defined in the above [2], including the steps of:
(1) placing a fibrous filler in a mold;
(2) impregnating the fibrous filler with a polymerizable composition as defined in the above [1];
(3) subjecting the above polymerizable composition with which the fibrous filler is impregnated to a bulk polymerization to cure the polymerizable composition whereby to provide a composite material; and
(4) demolding the composite material.

Effects of the Invention

The composite material of the present invention produced by using a polymerizable composition of the present invention has excellent mechanical strength and does not cause odor. Further, according to the method of the present invention, a composite material containing a fibrous filler that has excellent mechanical strength and does not cause odor can be produced.

MODES FOR CARRYING OUT THE INVENTION

The composite material of the present invention is a molded article made of cycloolefin-based resin obtained by subjecting a polymerizable composition containing a cycloolefin monomer to a bulk polymerization in a mold, and one of the features is in that the composite material contains a fibrous filler.

The above composite material of the present invention can be produced by, for example, the method of the present invention. The method of the present invention is a method including the steps of:
(1) placing a fibrous filler in a mold;
(2) impregnating the fibrous filler with a polymerizable composition of the present invention;
(3) subjecting the above polymerizable composition with which the fibrous filler is impregnated to a bulk polymerization to cure the polymerizable composition whereby to provide a composite material; and
(4) demolding the composite material.

Polymerizable Composition

The polymerizable composition of the present invention is prepared by properly mixing a cycloolefin monomer, a metathesis polymerization catalyst, a radical generator, a diisocyanate compound, and a polyfunctional (meth)acrylate compound, and optional components to be blended as needed, in accordance with a known method.

The above optional components include activators, activity regulators, elastomers, antioxidants, and the like.

First, each of the components contained in the polymerizable composition will be explained.

Cycloolefin Monomer

The cycloolefin monomer is a compound having an alicyclic structure and a carbon-carbon double bond within the molecule.

The alicyclic structure constituting the cycloolefin monomer includes monocyclic, polycyclic, condensed polycyclic, bridged ring, and combination polycyclic thereof, and the like. The carbon number constituting the alicyclic structure is not particularly limited, but usually the number is 4 to 30, preferably 5 to 20 and more preferably 5 to 15.

The cycloolefin monomer includes mono cycloolefin monomer, norbornene-based monomer and the like. The norbornene-based monomer is preferred. The norbornene-based monomer is a cycloolefin monomer having a norbornene ring structure within a molecule, which may be substituted by hydrocarbon group including alkyl group, alkenyl group, alkylidene group and aryl group, polar group, or the like. Furthermore, the norbornene-based monomer may include other double bonds besides the double bond of norbornene-ring.

The mono cycloolefin monomer includes cyclobutene, cyclopentene, cyclooctene, cyclododecene, cyclopentadiene, 1,5-cyclooctadiene and the like.

Specific examples of the norbornene-based monomer include:
dicyclopentadienes such as dicyclopentadiene and methyldicyclopentadiene;
tetracyclododecenes such as tetracyclo[$6.2.1.1^{3,6}.0^{2,7}$]dodec-4-ene, 9-ethylidenetetracyclo[$6.2.1.1^{3,6}.0^{2,7}$]dodec-4- ene, 9-phenyltetracyclo[6.2.1.1$^{3,6}$.0$^{2,7}$]dodec-4-ene, tetracyclo[6.2.1.1$^{3,6}$.0$^{2,7}$]dodec-9-en-4-carboxylate, and tetracyclo[6.2.1.1$^{3,6}$.0$^{2,7}$]dodec-9-en-4,5-dicarboxylic anhydride;

norbornenes such as 2-norbornene, 5-ethylidene-2-norbornene, 5-vinyl-2-norbornene, 5-phenyl-2-norbornene, 5-norbornen-2-yl acrylate, 5-norbornen-2-yl methacrylate, 5-norbornene-2-carboxylate, 5-norbornene-2,3-dicarboxylate, and 5-norbornene-2,3-dicarboxylic anhydride;

oxanorbornenes such as 7-oxa-2-norbornene and 5-ethylidene-7-oxa-2-norbornene;

tetra or higher polycycloolefins such as tetracyclo[9.2.1.0$^{2,10}$.0$^{3,8}$]tetradeca-3,5,7,12-tetraene (also called 1,4-methano-1,4,4a,9a-tetrahydro-9H-florene), pentacyclo[6.5.1.1$^{3,6}$.0$^{2,7}$.0$^{9,13}$]pentadeca-4,10-diene, pentacyclo[9.2.1.0$^{2,10}$.0$^{3,8}$]pentadeca-5,12-diene, and tricyclopentadiene; and the like.

Among these cycloolefin monomers, the cycloolefin having no polar groups is preferred because a low-water-absorbable molded article can be obtained. In addition, when a cycloolefin having an aromatic condensed ring such as tetracyclo[9.2.1.0$^{2,10}$.0$^{3,8}$]tetradeca-3,5,7,12-tetraene is used, the viscosity of the polymerizable composition can be lowered.

These cycloolefin monomers may be each used alone or may be used in a combination of two or more kinds. By using the monomers in combination, the physical properties of the cycloolefin-based resin obtained can be appropriately adjusted.

Here, the polymerizable composition of the present invention may contain an optional monomer which is copolymerizable with the above-mentioned cycloolefin monomer, so long as the exhibition of the effects of the present invention is not impaired.

Metathesis Polymerization Catalyst

The metathesis polymerization catalyst usable in the present invention is not particularly limited, so long as the cycloolefin monomer can be subjected to ring-opening polymerization, and a known one can be used.

The metathesis polymerization catalyst usable in the present invention is a complex composed of a transition metal atom as a center atom and plural ions, atoms, multiatomic ions, and/or compounds bound thereto. As the transition metal atom, the atoms of Groups 5, 6 and 8 (Long-period type Periodic Table, hereinafter referred to the same) are used. Although the atoms of each of the Groups are not particularly limited, the atoms of Group 5 include, for example, tantalum, the atoms of Group 6 include, for example, molybdenum and tungsten, and the atoms of Group 8 include, for example, ruthenium and osmium. Among these transition metal atoms, ruthenium and osmium of Group 8 are preferred. In other words, the metathesis polymerization catalyst used in the present invention is preferably a complex with ruthenium or osmium as a center atom, and more preferably a complex with ruthenium as a center atom. As the complex with ruthenium as a center atom, a ruthenium-carbene complex composed of ruthenium and carbene compounds coordinated thereto is preferred. Here, the term "carbene compound" collectively refers to compounds having a methylene free radical, which are compounds having a divalent carbon atom (carbene carbon) that is not electrically charged, as represented by (>C:). Since the ruthenium-carbene complex has excellent catalytic activity upon the bulk ring-opening polymerization, the polymer obtained has less odor originated from unreacted monomers, so that a high-quality polymer is obtained with excellent productivity. In addition, the complex is relatively stable against oxygen or water in the air, and is less likely to be deactivated, so that the complex can be used in the air. The metathesis polymerization catalyst may be used alone or in a combination of plural kinds.

The ruthenium-carbene complex includes a complex represented by the following general formula (1) or general formula (2).

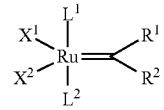

(1)

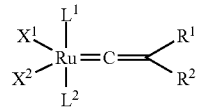

(2)

In the above general formulas (1) and (2), each of $R^1$ and $R^2$ is independently a hydrogen atom; a halogen atom; or an organic group having from 1 to 20 carbon atoms, which may contain a halogen atom, an oxygen atom, a nitrogen atom, a sulfur atom, a phosphorus atom or a silicon atom, and these groups may have a substituent, or may be bound to each other to form a ring. Examples of $R^1$ and $R^2$ that are bound to each other to form a ring include an indenylidene group which may have a substituent such as a phenylindenylidene group.

Specific examples of the organic group having from 1 to 20 carbon atoms which may contain a halogen atom, an oxygen atom, a nitrogen atom, a sulfur atom, a phosphorus atom, or a silicon atom include an alkyl group having from 1 to 20 carbon atoms, an alkenyl group having from 2 to 20 carbon atoms, an alkynyl group having from 2 to 20 carbon atoms, an aryl group having from 6 to 20 carbon atoms, an alkoxy group having from 1 to 20 carbon atoms, an alkenyloxy group having from 2 to 20 carbon atoms, an alkynyloxy group having from 2 to 20 carbon atoms, an aryloxy group having from 6 to 20 carbon atoms, an alkylthio group having from 1 to 8 carbon atoms, a carbonyloxy group, an alkoxycarbonyl group having from 1 to 20 carbon atoms, an alkylsulfonyl group having from 1 to 20 carbon atoms, an alkylsulfinyl group having from 1 to 20 carbon atoms, an alkylsulfonic acid group having from 1 to 20 carbon atoms, an arylsulfonic acid group having from 6 to 20 carbon atoms, a phosphonic acid group, an arylphosphonic acid group having from 6 to 20 carbon atoms, an alkylammonium group having from 1 to 20 carbon atoms, and an arylammonium group having from 6 to 20 carbon atoms, and the like. These organic groups having from 1 to 20 carbon atoms which may contain a halogen atom, an oxygen atom, a nitrogen atom, a sulfur atom, a phosphorus atom, or a silicon atom may have a substituent. Examples of the substituent include an alkyl group having from 1 to 10 carbon atoms, an alkoxy group having from 1 to 10 carbon atoms, and an aryl group having from 6 to 10 carbon atoms, and the like.

Each of $X^1$ and $X^2$ is independently any anionic ligand. The anionic ligand refers to a ligand having a negative electric charge when separated from a center metal atom, and includes, for example, a halogen atom, a diketonate group, a substituted cyclopentadienyl group, an alkoxyl group, an aryloxy group, a carboxyl group, and the like.

$L^1$ and $L^2$ stand for a heteroatom-containing carbene compound or a neutral electron donating compound other than the heteroatom-containing carbene compound. The heteroatom-containing carbene compound and the neutral electron donating compound other than the heteroatom-containing carbene compound are compounds having neutral electric charges when separated from the center metal. The heteroatom containing-carbene compound is preferred, from the viewpoint of improving catalytic activity. The heteroatom means atoms of Groups 15 and 16 of the Periodic Table, and specific examples include a nitrogen atom, an oxygen atom, a phosphorus atom, a sulfur atom, an arsenic atom, a selenium atom, and the like. Among them, a nitrogen atom, an oxygen atom, a phosphorus atom, and a sulfur atom are preferred, and a nitrogen atom is especially preferred, from the viewpoint of obtaining a stable carbene compound.

As the above heteroatom-containing carbene compound, a compound represented by the following general formula (3) or (4) is preferred, and the compound represented by the following general formula (3) is especially preferred, from the viewpoint of improving catalytic activity.

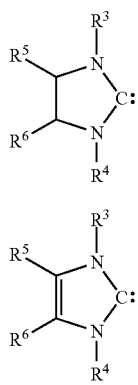

In the above general formulas (3) and (4), each of $R^3$, $R^4$, $R^5$ and $R^6$ stands for independently a hydrogen atom; a halogen atom; or an organic group having from 1 to 20 carbon atoms which may contain a halogen atom, an oxygen atom, a nitrogen atom, a sulfur atom, a phosphorus atom, or a silicon atom. Specific examples of the organic group having from 1 to 20 carbon atoms which may contain a halogen atom, an oxygen atom, a nitrogen atom, a sulfur atom, a phosphorus atom, or a silicon atom are the same as those cases for the above general formulas (1) and (2).

Alternatively, $R^3$, $R^4$, $R^5$ and $R^6$ may be bound to each other in any combinations to form a ring.

Here, since the effects of the present invention become more remarkable, it is preferable that $R^5$ and $R^6$ are hydrogen atoms. In addition, $R^3$ and $R^4$ are preferably aryl groups which may have a substituent, and the substituent is more preferably a phenyl group having an alkyl group having from 1 to 10 carbon atoms, and especially preferably a mesityl group.

The above neutral electron donating compound includes, for example, an oxygen atom, water, carbonyls, ethers, nitriles, esters, phosphines, phosphinites, phosphites, sulfoxides, thioethers, amides, imines, aromatics, cyclic diolefins, olefins, isocyanides, and thiocyanates, and the like.

In the above general formulas (1) and (2), each of $R^1$, $R^2$, $X^1$, $X^2$, $L^1$ and $L^2$ may be bound solely to form a polydentate chelating ligand, and/or bound to each other in any combinations to form a polydentate chelating ligand.

In addition, as the ruthenium-carbene complex used in the present invention, among the compounds represented by the above general formula (1) or (2), the compound represented by the above general formula (1) is preferred, from the viewpoint of making the effects of the present invention more remarkable. Among them, a compound represented by the general formula (5) or the general formula (6) given below is more preferred.

The general formula (5) is given hereinbelow.

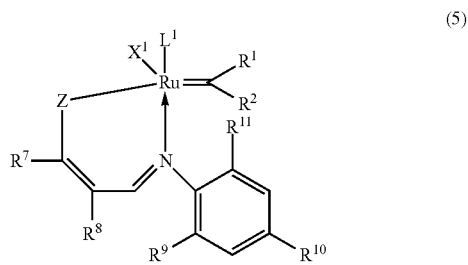

In the above general formula (5), Z is an oxygen atom, a sulfur atom, a selenium atom, $NR^{12}$, $PR^{12}$ or $AsR^{12}$, wherein $R^{12}$ is a hydrogen atom; a halogen atom; or an organic group having from 1 to 20 carbon atoms which may contain a halogen atom, an oxygen atom, a nitrogen atom, a sulfur atom, a phosphorus atom, or a silicon atom. Since the effects of the present invention are even more remarkable, it is preferable that Z is an oxygen atom.

Here, $R^1$, $R^2$, $X^1$ and $L^1$ are the same as defined in the cases of the above general formulas (1) and (2), each of which may be bound solely to form a polydentate chelating ligand and/or may be bound to each other in any combinations to form a polydentate chelating ligand, and it is preferable that $X^1$ and $L^1$ do not form a polydentate chelating ligand, and that $R^1$ and $R^2$ are bound to each other to form a ring, more preferably an indenylidene group which may have a substituent, and especially preferably a phenyl-indenylidene group.

In addition, specific examples of the organic group having from 1 to 20 carbon atoms which may contain a halogen atom, an oxygen atom, a nitrogen atom, a sulfur atom, a phosphorus atom, or a silicon atom are the same as the cases of the above general formulas (1) and (2).

In the above general formula (5), each of $R^7$ and $R^8$ is independently a hydrogen atom, an alkyl group having from 1 to 20 carbon atoms, an alkenyl group having from 2 to 20 carbon atoms, or a heteroaryl group having from 6 to 20 carbon atoms, and these groups may have a substituent, or may be bound to each other to form a ring. Examples of the substituent include an alkyl group having from 1 to 10 carbon atoms, an alkoxy group having from 1 to 10 carbon atoms, or an aryl group having from 6 to 10 carbon atoms. The ring when a ring is formed may be any of aromatic rings, alicyclic rings, and heterocyclic rings. It is preferable that an aromatic ring is formed, it is more preferable that an aromatic ring having from 6 to 20 carbon atoms is formed, and it is even more preferable that an aromatic ring having 6 to 10 carbon atoms is formed.

In the above general formula (5), each of $R^9$, $R^{10}$, and $R^{11}$ is independently a hydrogen atom; a halogen atom; or an organic group having from 1 to 20 carbon atoms which may contain a halogen atom, an oxygen atom, a nitrogen atom, a sulfur atom, a phosphorus atom, or a silicon atom, and these groups may have a substituent, or may be bound to each other to form a ring. In addition, specific examples of the organic group having from 1 to 20 carbon atoms which may contain a halogen atom, an oxygen atom, a nitrogen atom, a sulfur atom, a phosphorus atom, or a silicon atom are the same as the cases of the above general formulas (1) and (2).

It is preferable that $R^9$, $R^{10}$ and $R^{11}$ are a hydrogen atom or an alkyl group having from 1 to 20 carbon atoms, and especially preferably a hydrogen atom or an alkyl group having from 1 to 3 carbon atoms.

Here, specific examples of the compound represented by the above general formula (5) and production methods thereof include those described in, for example, WO 03/062253 (Japanese Unexamined Patent Publication No. 2005-515260), and the like.

The general formula (6) is given hereinbelow.

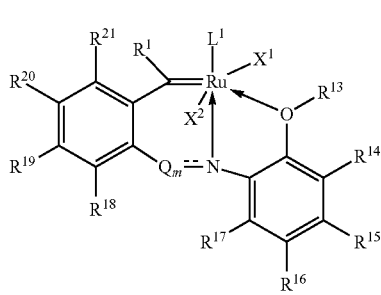

(6)

In the above general formula (6), m is 0 or 1. m is preferably 1, and in that case Q is an oxygen atom, a nitrogen atom, a sulfur atom, a methylene group, an ethylene group, or a carbonyl group, and preferably a methylene group.

═══ is a single bond or a double bond, and preferably a single bond.

$R^1$, $X^1$, $X^2$ and $L^1$ are the same as the cases of the above general formulas (1) and (2), each of which may be bound solely to form a polydentate chelating ligand and/or may be bound to each other in any combinations to form a polydentate chelating ligand. It is preferable that $X^1$, $X^2$ and $L^1$ do not form a polydentate chelating ligand, and that $R^1$ is a hydrogen atom.

$R^{13}$ to $R^{21}$ are a hydrogen atom; a halogen atom; or an organic group having from 1 to 20 carbon atoms which may contain a halogen atom, an oxygen atom, a nitrogen atom, a sulfur atom, a phosphorus atom, or a silicon atom, and these groups may have a substituent, or may be bound to each other to form a ring. In addition, specific examples of the organic group having from 1 to 20 carbon atoms which may contain a halogen atom, an oxygen atom, a nitrogen atom, a sulfur atom, a phosphorus atom, or a silicon atom are the same as the cases of the above general formulas (1) and (2).

$R^{13}$ is preferably an alkyl group having from 1 to 20 carbon atoms, and more preferably an alkyl group having from 1 to 3 carbon atoms, $R^{14}$ to $R^{17}$ are preferably a hydrogen atom, and $R^{18}$ to $R^{21}$ are preferably a hydrogen atom or a halogen atom.

Here, specific examples of the compound represented by the above general formula (6) and production methods thereof include those described in, for example, WO 11/079799 (Japanese Unexamined Patent Publication No. 2013-516392), and the like.

In addition, as the compound represented by the above general formula (1), in addition to the compound represented by the above general formula (5) or general formula (6), the following compound (7) can be preferably used. In the compound (7), $PCy_3$ is tricyclohexylphosphine, and Mes is a mesityl group.

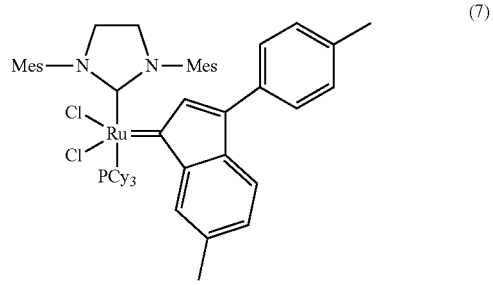

(7)

The amount of the metathesis polymerization catalyst used is preferably 0.005 mmol or more, more preferably from 0.01 to 50 mmol, and even more preferably from 0.015 to 20 mmol, per one mol of all the cycloolefin monomers used in the reaction.

Radical Generator

The radical generator has an action of generating radical with heating, thereby inducing a crosslinking reaction in the cycloolefin-based resin. A site at which a crosslinking reaction is induced by the radical generator is primarily a carbon-carbon double bond of the cycloolefin-based resin, and crosslinking may take place even at a saturated bond portion.

The radical generator includes organic peroxides, diazo compounds and nonpolar radical generators. The organic peroxide includes, for example, hydroperoxides such as t-butyl hydroperoxide, p-menthanehydroperoxide and cumene hydroperoxide; dialkyl peroxides such as di-t-butyl peroxide, dicumyl peroxide and t-butyl cumyl peroxide; diacyl peroxides such as dipropionyl peroxide and benzoyl peroxide; peroxyketals such as 2,5-dimethyl-2,5-di(t-butylperoxy)hexane, 2,5-dimethyl-2,5-di(t-butylperoxy)-3-hexyne, and 1,3-di(t-butylperoxyisopropyl)benzene; peroxyesters such as t-butyl peroxyacetate and t-butyl peroxybenzoate; peroxy carbonates such as t-butyl peroxy isopropylcarbonate and di(isopropylperoxy)dicarbonate; alkylsilyl peroxides such as t-butyl trimethylsilyl peroxide; and the like. Among them, the dialkyl peroxide is preferred, especially from the aspect that the impediment to the metathesis polymerization reaction in bulk polymerization is small.

The diazo compound includes, for example, 4,4'-bisazidobenzal(4-methyl)cyclohexanone, 4,4'-diazidochalcone, 2,6-bis(4'-azidobenzal)cyclohexanone, 2,6-bis(4'-azidobenzal)-4-methylcyclohexanone, 4,4'-diazidodiphenylsulfone, 4,4'-diazidodiphenylmethane, 2,2'-diazidostilbene and the like.

The nonpolar radical generator includes 2,3-dimethyl-2,3-diphenylbutane, 2,3-diphenylbutane, 1,4-diphenylbutane, 3,4-dimethyl-3,4-diphenylhexane, 1,1,2,2-tetraphenylethane, 2,2,3,3-tetraphenylbutane, 3,3,4,4-tetraphenylhexane, 1,1,2-triphenylpropane, 1,1,2-triphenylethane, triphenylmethane, 1,1,1-triphenylethane, 1,1,1-triphenylpropane, 1,1,1-triphenylbutane, 1,1,1-triphenylpentane, 1,1,1-triphenyl-2-propene, 1,1,1-triphenyl-4-pentene, 1,1,1-triphenyl-2-phenylethane and the like.

The amount of the radical generator in the polymerizable composition is usually from 0.1 to 10 parts by mass, and preferably from 0.5 to 5 parts by mass, based on 100 parts by mass of all the cycloolefin monomers used. When the amount of the radical generator is too small, a crosslinking reaction would be insufficient, thereby lowering flexural strength of the composite material. On the other hand, when the amount of the radical generator is too large, a crosslinking reaction would be carried out in excess, thereby making the composite material likely to be brittle.

Diisocyanate Compound

The diisocyanate compound includes, for example, aromatic diisocyanate compounds such as 4,4'-methylenediphenyl diisocyanate (MDI), toluene-2,4-diisocyanate, 4-methoxy-1,3-phenylene diisocyanate, 4-isopropyl-1,3-phenylene diisocyanate, 4-chloro-1,3-phenylene diisocyanate, 4-butoxy-1,3-phenylene diisocyanate, 2,4-diisocyanate diphenyl ether, 1,4-phenylene diisocyanate, tolylene diisocyanate, xylylene diisocyanate (XDI), 1,5-naphthalene diisocyanate, benzidine diisocyanate, o-nitrobenzidine diisocyanate, and 4,4'-diisocyanate dibenzyl; aliphatic diisocyanate compounds such as methylene diisocyanate, 1,4-tetramethylene diisocyanate, 1,6-hexamethylene diisocyanate, and 1,10-decamethylene diisocyanate; alicyclic diisocyanate compounds such as 4-cyclohexylene diisocyanate, 4,4'-methylenebis(cyclohexyl isocyanate), 1,5-tetrahydronaphthalene diisocyanate, isophorone diisocyanate, hydrogenated MDI, and hydrogenated XDI; and polyurethane prepolymers obtained by reacting these diisocyanate compounds with a low-molecular weight polyol or a polyamine to provide an isocyanate at its terminal; and the like. In addition, conventionally used known compounds that have a polyfunctional isocyanate group in the forms of isocyanurates, biurets, adducts, or polymerics can be used without particular limitations. Such compounds include, for example, a 2,4-tolylene diisocyanate dimer, triphenylmethane triisocyanate, tris-(p-isocyanate phenyl) thiophosphite, polyfunctional aromatic isocyanate compounds, polyfunctional aromatic aliphatic isocyanate compounds, polyfunctional aliphatic isocyanate compounds, fatty acid-modified polyfunctional aliphatic isocyanate compounds, polyfunctional blocked isocyanate compounds such as blocked polyfunctional aliphatic isocyanate compounds, polyisocyanate prepolymers, and the like. Among them, from the viewpoint of having excellent availability and ease in handling, the aromatic diisocyanate compounds, the aliphatic diisocyanate compounds, and the alicyclic diisocyanate compounds, which are polyfunctional, non-blocked isocyanate compounds, are preferably used.

These compounds can be each used alone or in combination of two or more kinds.

Here, the polyfunctional blocked isocyanate compound refers to a compound that is made inert at an ambient temperature by reaction of at least two of isocyanate groups in its molecule with an active hydrogen-containing compound. The above isocyanate compound generally has a structure in which the isocyanate groups are masked by blocking agents such as alcohols, phenols, ε-caprolactam, oximes, and active methylene compounds. Since a polyfunctional blocked isocyanate compound generally does not react at an ambient temperature, the compound has excellent storage stability, but an isocyanate group is regenerated by heating usually to from 140° to 200° C., whereby excellent reactivity can be exhibited.

The diisocyanate compound has an active hydrogen reactive group in its molecule that forms a chemical bond with a polyfunctional (meth)acrylate compound which is used together, and preferably a hydroxyl group existing in a polyfunctional (meth)acrylate compound, a hydroxyl group of a surface of a fibrous filler described later, a hydroxyl group of a cycloolefin-based resin, or the like. Consequently, it is considered that the diisocyanate compound plays a role of improving close contact between the cycloolefin-based resin and the fibrous filler.

The diisocyanate compounds may be each used alone or in combination of two or more kinds. The amount of the diisocyanate compound blended to the polymerizable composition of the present invention is preferably from 0.5 to 20 parts by mass, more preferably from 1 to 15 parts by mass, and even more preferably from 2 to 10 parts by mass, based on 100 parts by mass of all the cycloolefin monomers. The amount blended of within this range is preferred because close contact between the fibrous filler and the resin can be satisfied, while also controlling strength and heat resistance of the resin.

Polyfunctional (Meth)acrylate Compound

Further, in the present invention, a polyfunctional (meth)acrylate compound is used, from the viewpoint of increasing close contact of the fibrous filler, thereby improving mechanical strength of the composite material obtained. By using the compound together with a diisocyanate compound, it is assumed that the function of the diisocyanate compound as a close contact improving agent or a close contact enhancing agent is synergistically increased.

Preferred examples of the polyfunctional (meth)acrylate compound include a compound represented by the following general formula:

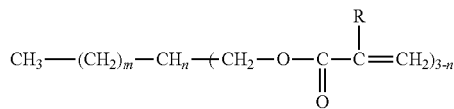

wherein R stands for H or $CH_3$; m is an integer of from 0 to 3; and n is 0 or 1. More specifically, the polyfunctional acrylate compound includes ethylene glycol dimethacrylate, triethylene glycol dimethacrylate, trimethylolpropane trimethacrylate, and neopentyl glycol dimethacrylate as preferred examples.

The polyfunctional acrylate compounds each may be used alone or in combination of two or more kinds. The amount of those compounds blended is preferably from 0.5 to 20 parts by mass, more preferably from 1 to 15 parts by mass, and even more preferably from 2 to 10 parts by mass, based on 100 parts by mass of all the cycloolefin monomers used. The amount blended of within this range is preferred because the function of the diisocyanate compound as a close contact improving agent or a close contact enhancing agent is synergistically increased, so that the close contact between the cycloolefin-based resin and the fibrous filler becomes excellent.

Optional Components

The polymerizable composition of the present invention may contain an optional component including, for example, an activator, an activity regulator, an elastomer, an antioxidant, or the like.

The activator is a compound that acts as a cocatalyst of the metathesis polymerization catalyst mentioned above to improve polymerization activity of the catalyst. As an activator, for example, an alkylaluminum halide such as ethyl aluminum dichloride or diethyl aluminum chloride; an alkoxyalkylaluminum halide in which a part of alkyl groups of these alkylammonium halides is substituted with an alkoxy group; an organotin compound; or the like may be used. The amount of the activator used is usually, but not particularly limited to, preferably from 0.1 to 100 mol, and more preferably from 1 to 10 mol, based on 1 mol of all the metathesis polymerization catalysts used in the polymerizable composition.

The activity regulator is used for preventing the polymerization to begin during the course of injection, upon mixing two or more reactive stock solutions to prepare a polymerizable composition, and injecting the composition in a mold to begin the polymerization.

An activity regulator when using a compound of a transition metal of Group 5 or Group 6 in the Periodic Table as a metathesis polymerization catalyst includes compounds having an action to reduce the metathesis polymerization catalyst or the like, and alcohols, halo alcohols, esters, ethers, nitriles, and the like can be used. Among them, alcohols and halo alcohols are preferable, and halo alcohols are particularly preferable.

Specific examples of alcohols include n-propanol, n-butanol, n-hexanol, 2-butanol, isobutyl alcohol, isopropyl alcohol, t-butyl alcohol and the like. Specific examples of halo alcohols include 1,3-dichloro-2-propanol, 2-chloroethanol, 1-chlorobutanol and the like.

An activity regulator when particularly using a ruthenium-carbene complex as a metathesis polymerization catalyst includes Lewis base compounds. The Lewis base compound includes Lewis base compounds containing a phosphorus atom such as tricyclopentyl phosphine, tricyclohexyl phosphine, triphenyl phosphine, triphenyl phosphite, and n-butyl phosphine; Lewis base compounds containing a nitrogen atom such as n-butylamine, pyridine, 4-vinylpyridine, acetonitrile, ethylenediamine, N-benzylidene methylamine, pyrazine, piperidine, and imidazole; and the like. Also, norbornenes substituted by an alkenyl group such as vinylnorbornene, propenylnorbornene and isopropenylnorbornene act as the above cycloolefin monomer, and also as an activity regulator at the same time. The amount of these active regulators used may be properly adjusted depending upon the compounds used.

The elastomer includes, for example, natural rubber, polybutadiene, polyisoprene, styrene-butadiene copolymer (SBR), styrene-butadiene-styrene block copolymer (SBS), styrene-isoprene-styrene copolymer (SIS), ethylene-propylene-diene terpolymer (EPDM), ethylene-vinyl acetate copolymer (EVA) and hydrogenated products of these, and the like. By using an elastomer to be dissolved in the polymerizable composition, the viscosity thereof can be controlled. Also, by adding an elastomer, the impact resistance of the composite material obtained can be improved. The amount of the elastomer used is preferably from 0.5 to 20 parts by mass, and more preferably from 2 to 10 parts by mass, based on 100 parts by mass of all the cycloolefin monomers in the polymerizable composition.

The antioxidant includes various antioxidants for plastics and rubbers such as phenolic, phosphorus-based, and amine-based antioxidants.

Preparation of Polymerizable Composition

The polymerizable composition of the present invention is prepared by properly mixing each of the components mentioned above in accordance with a known method, or the polymerizable composition may be prepared by mixing two or more reactive stock solutions immediately before the reaction. The reactive stock solutions are prepared in such a manner that the components mentioned above are each divided into two or more solutions so that the stock solutions do not undergo bulk polymerization with a single solution, but a polymerizable composition containing each of the components in a given ratio is formed when all the solutions are mixed. A combination of the two or more reactive stock solutions includes the following two types, (a) and (b), according to the kinds of the metathesis polymerization catalyst used.

(a): As the above metathesis polymerization catalyst, those exhibiting polymerization reaction activity when used together with an activator, but not having polymerization reaction activity when used alone, can be used. In this case, a polymerizable composition can be obtained by using a reactive stock solution (A) including a cycloolefin monomer and an activator and another reactive stock solution (B) including a cycloolefin monomer and a metathesis polymerization catalyst, and mixing these components. Further, a reactive stock solution (liquid C) including a cycloolefin monomer but not including any one of a metathesis polymerization catalyst and an activator may be used together.

(b): Also, when a metathesis polymerization catalyst having polymerization reaction activity is used alone, the polymerizable composition can be obtained by mixing a reactive stock solution (i) including a cycloolefin monomer and a reactive stock solution (ii) including a metathesis polymerization catalyst. As the reactive stock solution (ii) in this case, a solution prepared by dissolving or dispersing a metathesis polymerization catalyst in a small amount of an inactive solvent is usually used. The solvent includes, for example, aromatic hydrocarbons such as toluene, xylene, ethylbenzene, and trimethylbenzene; ketones such as methyl ethyl ketone, cyclopentanone, cyclohexanone, 2-heptanone, and 4-hydroxy-4-methyl-2-pentanone; cyclic ethers such as tetrahydrofuran; diethyl ether, dichloromethane, dimethyl sulfoxide, ethyl acetate and the like. Among them, the aromatic hydrocarbons are preferred, and toluene is especially preferred.

The radical generator, the diisocyanate compound, the polyfunctional (meth)acrylate compound, and the above optional components may be contained in any of the above reactive stock solutions, or they may be added in the form of a liquid mixture other than the above reactive stock solutions.

As described later, the method for production of the present invention can be carried out by applying a known resin molding method. It is preferable that the mixing of the above reactive stock solutions is carried out by selecting and using an appropriate mixer according to the resin molding method to be applied. The mixer includes, for example, collision mixers generally used in reaction injection-molding methods, low-pressure mixers such as dynamic mixers and static mixers, and the like. If reactive stock solutions are introduced into those mixers, components are immediately mixed to form a polymerizable composition. In the resin molding method described later, a polymerizable composition obtained would be directly injected into a mold.

Method for Producing Composite Material

The method for production of the present invention can be appropriately carried out by applying a known resin molding method in accordance with the shape of the desired composite material. The resin molding method includes, for example, reaction injection molding method (RIM method), resin transfer molding method (RTM method) and infusion molding method.

In the step (1), a fibrous filler is placed in a mold.

Fibrous Filler

The fibrous filler used in the present invention is not particularly limited so long as the fibrous filler is one used in the art of the present invention. The fibrous filler is preferably one or more members selected from the group consisting of carbon fibers and glass fibers, from the viewpoint of availability and usefulness. When the carbon fibers and the glass fibers are used together, although the mixing ratio of the both is not limited, it is preferable that the glass fibers are in an amount of from 0.1 to 10 parts by mass, based on 1 part by mass of the carbon fibers, from the viewpoint of mixing effects.

The form of the fibrous filler usable in the present invention is not particularly limited, which may be properly selected from a unidirectional material in which a fibrous filler is aligned in one direction, a woven fabric, a nonwoven fabric, matte, knit, braided cords, roving, chopped strands, or the like. Among them, a continuous fibrous form such as a unidirectional material, a woven fabric or a roving is preferred, and a unidirectional material is more preferred. The unidirectional material is preferred because impregnation property of the polymerizable composition can be improved to a high level, and a proportion of the fibers is high, so that the mechanical strength of the composite material obtained can be improved to a high level.

As the form of the woven fabric, a conventionally known one is utilizable, and, for example, all the woven structures in which the fibers crisscross such as plain weave, satin weave, twill, and triaxial woven fabric can be utilized. In addition, as the form of the woven fabric, not only two-dimensional woven fabrics but also stitched woven fabrics, three-dimensional woven fabrics and the like, in which fibers are reinforced in a thickness direction of the woven fabrics, can be utilized.

When a fibrous filler is used in a woven fabric or the like, the fibrous filler is usually utilized as fiber bundle yarn. Although the number of filaments in each fibrous bundled yarn is not particularly limited, the number of filaments is preferably within the range of from 1,000 to 100,000, more preferably from 5,000 to 50,000, and even more preferably from 10,000 to 30,000.

The carbon fibers used in the present invention are not particularly limited, and, for example, various carbon fibers produced by conventionally known methods, such as acrylic, pitched, rayon-based carbon fibers can be optionally used. Among them, PAN-based carbon fibers which are produced using polyacrylonitrile fibers as a raw material are preferably used because properties such as mechanical strength and heat resistance in the composite material obtained can be improved without causing inhibition of the metathesis ring-opening polymerization reaction.

The carbon fibers are preferred because rigidity can be maintained if their elastic moduli are higher, and the thickness of the carbon fibers-reinforced composite material can be thinned. On the other hand, if the elastic moduli are too high, tensile elongation may be lowered in some cases. The carbon fibers having tensile moduli according to a resin-impregnated strand tensile test (JIS R-7601) within the range of preferably from 200 to 400 GPa are preferred, and the carbon fibers having tensile moduli within the range of from 220 to 300 GPa are more preferred. Also, the carbon fibers having a higher tensile elongation are preferred. The tensile elongation is preferably 1.7% or more, more preferably 1.85% or more, and especially preferably 2% or more. Although the upper limit in the tensile elongation is not particularly limited, the tensile elongation is usually 2.5% or less. The tensile elongation of the carbon fibers can be measured by the above resin-impregnated strand tensile test. It is preferable that the higher the tensile elongation of the carbon fibers, the stronger the fibers and more easily handleable, so that the mechanical strength of the composite material obtained becomes high.

From the viewpoint of further improving close contact of the carbon fibers to the matrix resin, it is preferable that at least an active hydrogen-containing group such as a carboxyl group or a hydroxyl group is present in a proper amount on the surface of the carbon fibers. The amount of the active hydrogen-containing group of the carbon fibers can be quantified by a surface oxygen concentration (O/C) determined by X-ray photoelectron spectroscopy. It is preferable that the amount of the active hydrogen-containing group of the carbon fibers, in terms of O/C, is from 0.02 to 0.2. The amount within this range is preferred because the action of the active hydrogen-reactive group contained in the cycloolefin monomer or the diisocyanate compound to the carbon fibers is increased, and the extent of oxidation of the carbon fiber surface is appropriate. The amount of the active hydrogen-containing group of the carbon fibers, in terms of O/C, is more preferably from 0.04 to 0.15, and even more preferably from 0.06 to 0.1.

The method for introducing an active hydrogen-containing group into carbon fibers is not particularly limited, and a method ordinarily used may be appropriately employed. The method includes ozone method, electrolytic oxidation in an acidic solution and the like, and an oxidation reaction in a solution is preferred because it is economically advantageous. In that case, the amount of the active hydrogen-containing group can be properly adjusted by an amount of current, temperature, residence time in an acidic bath, acidity, or the like.

The surface condition of the carbon fibers is not particularly limited, which may be smooth or rough. It is preferable that the surface condition is rough because anchoring effects can be expected. The extent of this roughness may be properly selected. The introduction of roughness to the carbon fiber surface can be simultaneously carried out, for example, during an oxidation reaction in a solution mentioned above.

The cross-sectional shape of the carbon fibers is preferably, but not particularly limited to, substantially circular. When the cross-sectional shape is circular, realignment of the filaments is more likely to take place when the carbon fibers are impregnated with a polymerizable composition, thereby facilitating the penetration of the polymerizable composition between the fibers. In addition, there are more advantages that the thickness of the fiber bundles can be thinned, so that a composite material having excellent drapability is more likely to be obtained. Here, the cross-sectional shape which is substantially circular refers to a deformation degree of 1.1 or less, in a case where a ratio (R/r) of a radius R of a circumscribed circle to a radius r of an inscribed circle is defined as a deformation degree.

The length of the carbon fibers may be suitably selected depending upon the applications, and any one of short fibers and long fibers can be used. The length of the carbon fibers is usually 1 cm or more, preferably 2 cm or more, and more preferably 3 cm or more, from the viewpoint of further increasing mechanical strength of the composite material obtained, and it is especially preferable to use carbon fibers that are continuous fibers.

It is not necessary that the carbon fibers used in the present invention are previously adhered to a sizing agent, it is preferable that carbon fibers to which a sizing agent is previously adhered are used, from the viewpoint of further improving disadvantages such as the lowering of the physical properties after molding due to fiber fluffing, or close contact between the cycloolefin polymer, which is the matrix resin, and the carbon fibers.

The sizing agent is not particularly limited, and a known one can be used. The sizing agent includes, for example, at least one member selected from the group consisting of epoxy resins; urethane resins; vinyl ester resins; polyamide resins; polyolefin resins such as nylon resins, polyethylene, and polypropylene; polyester resins; and phenol resins. As the sizing agent, at least one member selected from the group consisting of epoxy resins, urethane resins, vinyl ester resins, and polyolefin resins is preferred, and an epoxy resin and/or a vinyl ester resin is more preferred, because of easy availability.

Specific examples of the sizing agent described above include sizing agents made of epoxy resins, such as KP-226, KP-0110, KP-136, KP-300, KP-752, and KP-1005; sizing agents made of urethane resins, such as KP-2816, KP-2817, KP-2807, KP-2820, and KP-2821; sizing agents made of vinyl ester resins, such as KP-371 and KP-372; sizing agents made of nylon resins, such as KP-1008; sizing agents made of polyethylene resins, such as P-138; sizing agents made of polypropylene resins, such as TPE-100 and TPE-102; and sizing agents made of polyester resins, such as KP-880 and KP-881, all of which are products manufactured by Matsumoto Yushi-Seiyaku Co., Ltd., and the like.

The adhesion of the sizing agent to the carbon fibers can be carried out by contacting a sizing agent with the carbon fibers. During the contact, it is preferable that the sizing agent is dispersed or dissolved in water or an organic solvent such as acetone and used as a dispersion or a solution. It is preferable that a surfactant is properly added to the dispersion or solution, from the viewpoint of increasing dispersibility of the sizing agent and making liquid stability excellent.

The amount of the sizing agent adhered to the carbon fibers is usually from 0.1 to 5% by mass, preferably from 0.2 to 3% by mass, and more preferably from 0.5 to 2% by mass, assuming that a total amount of the carbon fibers and the sizing agent is 100% by mass. If the amount adhered is within this range, appropriate bundling of the carbon fibers is obtained, and sufficient rubbing resistance of the carbon fibers is obtained, thereby suppressing the generation of fluffing due to mechanical frictions or the like, and impregnation property of the cycloolefin monomer is improved, so that mechanical strength can be improved in the composite material obtained.

The contact of the carbon fibers and the sizing agent can be appropriately carried out by a method generally employed in the industries, such as a roller dipping method or a roller contact method. Since the carbon fibers and the sizing agents are contacted usually with a dispersion or solution of the sizing agent, after the contact, the mixture is subjected to a drying step, so that water or the organic solvent contained in the dispersion or solution of the sizing agent may be removed. The drying step can be carried out by a method utilizing hot air, a hot plate, a roller, and various infrared heaters, or the like as a heating medium.

Here, it is preferable that the adhesion of the sizing agent to the carbon fibers is carried out after the introduction of an active hydrogen-containing group or after the introduction of roughness to the carbon fiber surface mentioned above.

The glass fibers usable in the present invention are not particularly limited, and include, for example, those having the forms of continuous fibers, woven fabrics and nonwoven fabrics, and the like, and those having various thicknesses are available as commercial products. The forms and the thickness of the glass fibers can be properly selected according to the applications of the composite materials obtained.

The basis weight of the glass fibers used in the present invention is properly selected depending upon the use and purposes, and the basis weight is preferably 600 g/m$^2$ or more, more preferably from 600 to 2,000 g/m$^2$, and even more preferably from 640 to 1,800 g/m$^2$. When the basis weight of the glass fibers is too small, some spaces are created among the neighboring glass fibers, so that the mechanical strength of the composite material obtained would be insufficient. On the other hand, when the basis weight is exceedingly large, flexibility is lowered, and the parts overlaying with the neighboring glass fibers themselves would be created, so that the impregnation property of the polymerizable composition is likely to be impaired.

It is preferable that the glass fibers are subjected to hydrophobic treatment on their surface. By using the hydrophobically treated glass fibers, the glass fibers can be homogeneously dispersed in the composite material obtained, so that rigidity and dimensional stability of the composite material can be made even, and further that isotropy can be made smaller. The treatment agent usable in the hydrophobic treatment includes silane coupling agents, titanate coupling agents, aluminum coupling agents, fatty acids, fats and oils, surfactants, waxes, other polymers, and the like. These treatment agents can also serve as a sizing agent.

Mold

The mold to be used may be appropriately selected according to the applied resin molding method by taking the shape of the desired composite material into consideration. In the method of the present invention, since reactive stock solutions having low viscosities are used and molding can be carried out at a relatively low temperature and a relatively low pressure, the mold used in molding is not necessarily needed to be an expensive mold having high rigidity. The mold is not limited to a metallic mold, and a mold made of a resin or a simple mold frame can be used.

The fibrous filler may be appropriately placed in a selected mold according to an applicable resin molding method in a suitable manner for carrying out the method [the step (1)]. Prior to carrying out the step (2), the internal of the mold may be replaced with an inert gas such as nitrogen gas, or the internal may be subjected to a reduced pressure.

In the step (2), the fibrous filler placed in the mold is impregnated with a given polymerizable composition.

RIM Method

In this method, the mold is not particularly limited, and the molds in the form of a split mold structure comprising a core mold and a cavity mold are usually used. The core mold and the cavity mold are prepared so that a cavity is formed in a shape matching the desired composite material. The fibrous filler is placed in the cavity of the mold. The impregnation of the fibrous filler with the polymerizable composition is carried out by injecting a polymerizable composition into a mold. The polymerizable composition of the present invention has a low viscosity and excellent impregnation property with a substrate, so that the fibrous filler can be homogeneously impregnated with the composition.

In the molding of two-liquid reactive resins according to an RIM method, the pressure at which raw materials (polymerizable composition) are injected into a mold during molding is from 1/30 to 1/500 or so, of the injection molding for injecting resins. For this reason, filling property into the mold is highly favorable, thereby making it possible to mold into diversified shapes. Since an injection pressure into the mold is very low, an internal pressure generated in the mold is also very low. Therefore, the strength required for the mold is dramatically reduced as compared to the mold used in injection molding, thereby facilitating the designing of the mold. Therefore, the designing of the mold for a large-scaled molded article is made easy, so that the development to the pipe members having a large aperture with which development of pipe members made of resins is difficult is made easy. In addition, there is a feature that the molding can be carried out in an ambient temperature region.

The filling pressure (injection pressure) upon filling the polymerizable composition in the cavity of the mold is usually from 0.01 to 10 MPa, and preferably from 0.02 to 5 MPa. In addition, the mold clamping pressure is usually within the range of from 0.01 to 10 MPa.

RTM Method

In the RTM (Resin Transfer Molding) method, a polymerizable composition is injected in a mold packed with the fibrous filler, and the fibrous filler is impregnated with the composition.

In the molding according to an RTM method, in addition to the matter that a pressure generated in a mold is low in the same manner as in the RIM method, a mixing pressure would not be required as much as the RIM method upon mixing the reactive stock solutions, thereby making it possible to relatively simplify the mixing facilities. In addition, generally, the rate of polymerization is milder than that of the RIM method, thereby making it likely to be advantageous in the aspect of impregnation.

The filling pressure (injection pressure) upon filling the polymerizable composition in the cavity of the mold is usually from 0.01 to 10 MPa, and preferably from 0.02 to 5 MPa. In addition, the mold clamping pressure is usually within the range of from 0.01 to 10 MPa.

Infusion Molding Method

According to the infusion molding method, a polymerizable composition is filled in a mold at a vacuum pressure, i.e. 0.1 to 100 Pa or so, and the fibrous filler is impregnated with the composition. Specifically, in a state that the fibrous filler is placed on a mold, or optionally a mold releasing sheet and a resin diffusion material are placed thereon, the fibrous filler is covered with an airproof film and a viscous sealant, and the air is sucked out of the airproof space to make in a reduced pressure state. In this reduced pressure state, a polymerizable composition is injected in the airproof space, and the fibrous filler is impregnated with the polymerizable composition. In this method, not only a half of the mold is needed because one side is covered with the airproof film, but also the method is a molding method without soiling or odor, so that the method is suitable in the molding of molded articles having high strength, such as large-scaled molded articles, and thick molded articles. It is preferable that the mold releasing sheet, the resin diffusion material, the airproof film, the sealant, or the polymerizable composition liquid inlet port is not easily dissolved in the polymerizable composition during molding as an outermost layer of a side contacting the composition solution. These materials for the outermost layer of the polymerizable composition side include polyethylene, polypropylene, nylon, polyethylene terephthalate, polyethylene naphthalate, polymethyl (meth) acrylate, silicone resins, and the like, and a metal member can also be used.

In the method of the present invention, in addition to the above methods, as an improved method, a light-resin transfer molding (L-RTM) molding method can also be applied. Basically, the molding method is a method in which an infusion molding method and an RTM method are combined, wherein the mold comprises a concave-convex structure, comprising a concave mold in which the fibrous filler is placed, and a convex mold covering thereon, wherein pressure is reduced at the outer circumferential flange portion and a central portion of the mold. The mold clamping is carried out by making the internal of the mold to vacuum, i.e. 0.1 to 100 Pa or so, and a polymerizable composition is injected from the outer circumference, and the fibrous filler is impregnated with the composition. The excess polymerizable composition is detained at the pot at the center of the mold. The polymerizable composition would be in a state of pushing in from the outer circumference, so that the injection of the composition is carried out by pressure reduction and pressure raise. The filling pressure (injection pressure) upon filling the polymerizable composition in the cavity of the mold is usually from 0.01 to 10 MPa, and preferably from 0.02 to 5 MPa. In addition, the mold clamping pressure is usually within the range of from 0.01 to 10 MPa.

Other Impregnation Methods

As other impregnation methods, for example, a method including furnishing a fibrous filler in a dry state wound around an optional cylinder according to a filament winding method, and dipping the fibrous filler in a polymerizable composition to impregnate with the composition; a method including spraying a polymerizable composition to the fibrous filler, and impregnating the fibrous filler with the composition; a method including individually spraying individual reactive stock solutions to the fibrous filler in combination of the above reactive stock solutions, mixing the reactive stock solutions at the same time as spraying, and impregnating the fibrous filler with the polymerizable composition; or the like can be used.

The quantitative relationship between the polymerizable composition with which the fibrous filler is to be impregnated and the fibrous filler is such that the fibrous filler is preferably from 0.6 to 4 parts by mass, more preferably from 0.8 to 3 parts by mass, and even more preferably from 1 to 2 parts by mass, based on 1 part by mass of the polymerizable composition. It is preferable that the relationship is within the above range because the flexural strength of the composite material obtained is excellently exhibited.

Here, the polymerizable composition may be injected or the like to a mold to allow the fibrous filler to be impregnated, and maintained in that state for a given amount of time. It is preferable that the maintaining time is usually from 1 to 200 minutes or so. By maintaining in the manner as described above, the polymerizable composition can be sufficiently diffused to entire areas of the fibrous filler.

In the step (3), the polymerizable composition impregnated with the fibrous filler is subjected to a bulk polymerization, and the polymerizable composition is cured, to provide a composite material.

The bulk polymerization is carried out by heating a mold into which a polymerizable composition is injected or the like. As the temperature during the bulk polymerization, in other words the mold temperature, the highest temperature is preferably 90° C. or higher and 300° C. or lower. The highest temperature is more preferably from 100° to 270° C., and even more preferably from 120° to 250° C. In addition, the lowest temperature during the bulk polymerization is preferably from 40° to 90° C., and more preferably from 50° to 85° C. The initiation temperature of the bulk polymerization is usually within the range of from 0° to 40° C., and preferably within the range of from 10° to 30° C. The bulk polymerization is completed after preferably from 20 seconds to 60 minutes, and more preferably 20 seconds to 40 minutes from injecting or the like a polymerizable composition in a mold, or introducing reactive stock solutions to a given mixer, and the polymerization may be maintained thereat for 60 to 200 minutes or so. In addition, the heating may be carried out in a single step, or in plural steps of two or more steps. When heating is carried out in two steps, for example, an embodiment includes that a first-step heating is carried out at a mold temperature of preferably from 60° to 110° C., and more preferably from 70° to 100° C., and at a heating time of preferably from 10 to 120 minutes, and more preferably from 20 to 100 minutes, and that a second-step heating is carried out at a mold temperature of preferably from 111° to 250° C., and more preferably from 120° to 200° C., and at a heating time of preferably of from 10 to 120 minutes, and more preferably from 20 to 100 minutes.

After the termination of bulk polymerization, for example, demolding is carried out by mold-opening a mold frame [step (4)], whereby a composite material can be obtained. The demolding as used herein refers to taking out of a composite material from a mold used. Since a composite material immediately after the production is in a high-temperature state, it is preferable that the demolding is carried out after cooling the composite material to an ambient temperature.

Composite Material

As described above, the composite material of the present invention is obtained. Specifically, the composite material of the present invention is obtained by curing a polymerizable composition containing a cycloolefin monomer, a metathesis polymerization catalyst, a radical generator, a diisocyanate compound, and a polyfunctional (meth)acrylate compound, in which the polymerizable composition is impregnated with a fibrous filler. The strength of the composite material of the present invention can be evaluated as flexural strength in a substantially perpendicular direction of the composite material against a direction of filling of the fibrous filler. A specific evaluation method is as described later.

In the present invention, as the above flexural strength at 23° C., for example, a composite material having a flexural strength of 60 MPa or more is preferred because the composite material can be evaluated as a composite material having sufficient mechanical strength. As the above flexural strength in a substantially perpendicular direction, a composite material having a flexural strength of 65 MPa or more is more preferred, and a composite material having a flexural strength of 70 MPa or more is even more preferred. In the composite material, when the adhesion of the fibrous filler and the polymer is insufficient, the above flexural strength in a substantially perpendicular direction is drastically lowered.

Since the composite material of the present invention is produced by using a polymerizable composition having specified components, odor caused by the composite material is suppressed. Therefore, according to the present invention, the operating environment of the persons involved in the manufacture of composite materials can be remarkably improved. The presence or absence of odor of the composite material can be judged by, for example, evaluation of plural panelists described later.

The amount of the fibrous filler in the composite material of the present invention is preferably from 40 to 85% by mass, more preferably from 45 to 80% by mass, and even more preferably from 50 to 65% by mass. If the amount of the fibrous filler is within the above range, the desired flexural strength is sufficiently exhibited by the composite material. In the present invention, it can be assumed that a total of the mass of the fibrous filler and the polymerizable composition is identical to the mass of the produced composite material, so that the amount of the fibrous filler in the composite material of the present invention can be calculated from the amount of the fibrous filler filled and the amount of the polymerizable composition filled, or the specific gravity of the composite material.

EXAMPLES

The present invention will be further described in detail hereinbelow by means of Examples, without intending to limit the present invention to these Examples.

[Example 1] Infusion Molding Method

Five sheets of unidirectional carbon fibers U-200C (basis weight: 200 g/m$^2$) manufactured by Nissei Kabushiki Kaisha cut out at a length of 250 mm and a width of 200 mm were laminated in the same orientation on a chromium-plating SS400 flat plate having an internal length of 300 mm and a width of 250 mm, which was previously subjected to mold release treatment, to give a fibrous filler. In the state that a mold release sheet and a resin diffusion material were placed, the fibrous filler was covered with an airproof film and an airproof sealant to form an airproof space. The internal of the airproof space was reduced to a pressure of 100 Pa using an oil pump, to give an integrated material. The fibrous filler used in this example is a unidirectional material because unidirectional materials are laminated in the same direction.

Thirty-two grams of a polymerizable composition set at 20° C., composed of 100 parts by mass of RIM monomer manufactured by Nippon Zeon Co., Ltd., 5 parts by mass of trimethylolpropane trimethacrylate (TMPT), 5 parts by mass of 4,4'-methylenediphenyl diisocyanate, 1.7 parts by mass of di-t-butyl peroxide manufactured by Kayaku Akuzo Corporation under the manufactured product name of "Kayabutyl D(Registered Trademark), and 0.04 parts by mass of a metathesis polymerization catalyst the above compound (7), was introduced into an integrated material obtained above (hereinafter referred to as "mold") to allow the fibers to be impregnated with the polymerizable composition. Here, at that time, the mold was set to 40° C. The pressure reducing line and the composition introducing line were closed, and the mold was allowed to stand for 1 hour. Subsequently, the temperature of the mold was raised to 90° C. and allowed to stand for 0.5 hours, and thereafter the temperature was further raised to 200° C. and allowed to stand thereat for 1 hour. Here, the components of the above RIM monomers were composed of about 90 parts by mass of dicyclopentadiene and about 10 parts by mass of tricyclopentadiene, and the amount of the metathesis polymerization catalyst used was 0.055 mmol based on 1 mol of all the cycloolefin monomers.

The mold was cooled to an ambient temperature, and thereafter a cured composite material was demolded. As a result of evaluation of odor of the composite material obtained by the following method, the odor was judged as being "absent." Next, flexural strength in 0° orientation of the composite material obtained at 23° C. was measured, and as a result, the flexural strength was 1,440 MPa. Further, flexural strength in 90° orientation was measured under the same conditions, and as a result, the flexural strength was 82 MPa. The production conditions and the evaluation results are shown in Tables 1 and 2.

Examples 2 to 5

Composite materials were produced in the same manner as in Example 1 except that the production conditions were changed as listed in Table 1. The production conditions and the evaluation results are shown in Tables 1 and 2.

Comparative Examples 1 to 4

Composite materials were produced in the same manner as in Example 1 except that the production conditions were changed as listed in Table 1. The production conditions and the evaluation results are shown in Tables 1 and 2.

TABLE 1

|  | Diisocyanate or the like | TMPT | Kayabutyl D | Catalyst Compound (7) |
|---|---|---|---|---|
| Ex. 1 | 4,4'-Methylenediphenyl diisocyanate | 5 | 5 | 1.7 | 0.04 |
| Ex. 2 | 4,4'-Methylenediphenyl diisocyanate | 1 | 5 | 1.7 | 0.04 |
| Ex. 3 | m-Xylylene diisocyanate | 5 | 5 | 1.7 | 0.04 |
| Ex. 4 | Isophorone diisocyanate | 5 | 5 | 1.7 | 0.04 |
| Ex. 5 | Hexamethylene diisocyanate | 5 | 5 | 1.7 | 0.04 |
| Comp. Ex. 1 | 2-Isocyanatoethylmethacrylate (MOI) | 5 | 5 | 1.7 | 0.04 |
| Comp. Ex. 2 | 4,4'-Methylenediphenyl diisocyanate | 5 | 0 | 1.7 | 0.04 |
| Comp. Ex. 3 | Hexamethylene diisocyanate | 2 | 0 | 1.7 | 0.04 |
| Comp. Ex. 4 | Isophorone diisocyanate | 5 | 0 | 1.7 | 0.04 |

Units: parts

TABLE 2

|  | Fibers | Primary Curing | Secondary Curing | Odor After Curing | Flexural Strength (MPa) 0° Orientation | 90° Orientation |
|---|---|---|---|---|---|---|
| Ex. 1 | U-200C | 90° C., 0.5 h | 200° C., 1 h | Absent | 1,440 | 82 |
| Ex. 2 | U-200C | 90° C., 0.5 h | 200° C., 1 h | Absent | 1,220 | 82 |
| Ex. 3 | U-200C | 90° C., 0.5 h | 200° C., 1 h | Absent | 1,320 | 80 |
| Ex. 4 | U-200C | 90° C., 0.5 h | 200° C., 1 h | Absent | 1,350 | 81 |
| Ex. 5 | U-200C | 90° C., 0.5 h | 200° C., 1 h | Absent | 1,260 | 80 |
| Comp. Ex. 1 | U-200C | 90° C., 0.5 h | 200° C., 1 h | Present | 1,300 | 79 |
| Comp. Ex. 2 | U-200C | 90° C., 0.5 h | 200° C., 1 h | Absent | 1,165 | 32 |
| Comp. Ex. 3 | U-200C | 90° C., 0.5 h | 200° C., 1 h | Absent | 605 | 18 |
| Comp. Ex. 4 | U-200C | 90° C., 0.5 h | 200° C., 1 h | Absent | 970 | 29 |

It could be seen from the above tables that all the composite materials of the present invention produced by the methods of Examples are composite materials having no odors, and having excellent mechanical strength having the desired flexural strength in the 90° orientation (substantially perpendicular direction).

On the other hand, although the composite material produced by a method without using a diisocyanate compound (Comparative Example 1) had a flexural strength in a substantially perpendicular direction of exceeding 60 MPa, odor was generated. Further, although the composite materials produced by a method without using a polyfunctional acrylate compound TMPT (Comparative Examples 2 to 4) were odorless, all of flexural strength in a substantially perpendicular direction were far below 60 MPa.

[Evaluation of Odor]

The presence or absence of the odor of the composite materials obtained was evaluated as follows.

Five male panelists who have been involved in research and development or manufacture in the art of the present invention over several years were selected. In each of the above Examples and Comparative Examples, when a composite material that was heated to 200° C., allowed to stand for one hour, and cooled to an ambient temperature was taken out, each panelist was asked if any disagreeable feels were experienced in any of the mucous membranes in the eyes, nasal cavities, and throat. If one or more panelists experienced a disagreeable feel, the composite material was judged as "present" in odor, and if all the panelists did not experience a disagreeable feel, the composite material was judged as "absent" in odor.

INDUSTRIAL APPLICABILITY

Since the composite material obtained by the method of the present invention has excellent mechanical strength, the composite material can be suitably used in fields generally in which composite materials of fibrous fillers such as glass fibers and carbon fibers are generally used, for example, housings and structural parts of moving objects or movable objects.

The invention claimed is:

1. A method for producing a composite material, comprising the steps of:
   (1) placing a fibrous filler in a mold;
   (2) impregnating the fibrous filler with a polymerizable composition comprising a cycloolefin monomer, a metathesis polymerization catalyst, a radical generator, a diisocyanate compound, and a polyfunctional (meth)acrylate compound;
   (3) subjecting the polymerizable composition which is impregnated with a fibrous filler to a bulk polymerization to cure the polymerizable composition whereby to provide a composite material; and
   (4) demolding the composite material;
   wherein the metathesis polymerization catalyst is a compound represented by the following general formula (5) or the following general formula (6):

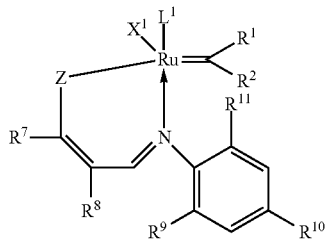

(5)

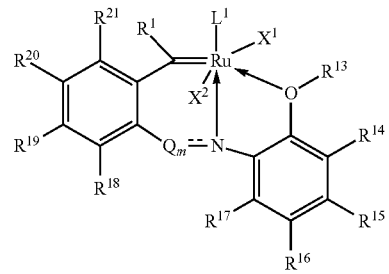

(6)

wherein Z is an oxygen atom, a sulfur atom, a selenium atom, $NR^{12}$, $PR^{12}$ or $AsR^{12}$, wherein $R^{12}$ is a hydrogen atom; a halogen atom; or an organic group having from 1 to 20 carbon atoms which may contain a halogen atom, an oxygen atom, a nitrogen atom, a sulfur atom, a phosphorus atom, or a silicon atom;

- each of $R^1$ and $R^2$ is independently a hydrogen atom; a halogen atom; or an organic group having from 1 to 20 carbon atoms, which may contain a halogen atom, an oxygen atom, a nitrogen atom, a sulfur atom, a phosphorus atom or a silicon atom, and $R^1$ and $R^2$ may have a substituent, or $R^1$ and $R^2$ may be bound to each other to form a ring;
- $X^1$ is an anionic ligand;
- $L^1$ stands for a heteroatom-containing carbene compound or a neutral electron donating compound other than the heteroatom-containing carbene compound;
- wherein each of $R^1$, $R^2$, $X^1$ and $L^1$ may be bound solely to form a polydentate chelating ligand and/or may be bound to each other in any combinations to form a polydentate chelating ligand;
- each of $R^7$ and $R^8$ is independently a hydrogen atom, an alkyl group having from 1 to 20 carbon atoms, an alkenyl group having from 2 to 20 carbon atoms, or a heteroaryl group having from 6 to 20 carbon atoms, and any of the groups of $R^7$ and $R^8$ may have a substituent, or $R^7$ and $R^8$ may be bound to each other to form a ring;
- each of $R^9$, $R^{10}$, and $R^{11}$ is independently a hydrogen atom; a halogen atom; or an organic group having from 1 to 20 carbon atoms which may contain a halogen atom, an oxygen atom, a nitrogen atom, a sulfur atom, a phosphorus atom, or a silicon atom, and $R^9$, $R^{10}$, and $R^{11}$ may have a substituent, or $R^9$, $R^{10}$, and $R^{11}$ may be bound to each other to form a ring;

wherein m is 0 or 1;

- Q is an oxygen atom, a nitrogen atom, a sulfur atom, a methylene group, an ethylene group, or a carbonyl group;

- - - - - is a single bond or a double bond;
- $R^1$ is a hydrogen atom; a halogen atom; or an organic group having from 1 to 20 carbon atoms, which may contain a halogen atom, an oxygen atom, a nitrogen atom, a sulfur atom, a phosphorus atom or a silicon atom, and $R^1$ may have a substituent;
- each of $X^1$ and $X^2$ is independently an anionic ligand;
- $L^1$ stands for a heteroatom-containing carbene compound or a neutral electron donating compound other than the heteroatom-containing carbene compound;
- wherein each of $R^1$, $X^1$, $X^2$ and $L^1$ may be bound solely to form a polydentate chelating ligand and/or may be bound to each other in any combinations to form a polydentate chelating ligand;
- $R^{13}$ to $R^{21}$ are each a hydrogen atom; a halogen atom; or an organic group having from 1 to 20 carbon atoms which may contain a halogen atom, an oxygen atom, a nitrogen atom, a sulfur atom, a phosphorus atom, or a silicon atom, and $R^{13}$ to $R^{21}$ may have a substituent, or $R^{13}$ to $R^{21}$ may be bound to each other to form a ring.

2. The method according to claim 1, wherein the highest temperature during the bulk polymerization is 90° C. or higher and 300° C. or lower.

\* \* \* \* \*